United States Patent
Haski et al.

(10) Patent No.: US 7,037,038 B1
(45) Date of Patent: May 2, 2006

(54) DUAL DIRECTION WATER SURFACE SKIMMER AND POOL SIDE DOCKING DEVICE

(75) Inventors: Robert R. Haski, 54 Waterloo Road, North Ryde, New South Wales, 2113 (AU); Allan Dolph Meyer, Cherrybrook (AU); Norman Michael Berry, Cherrybrook (AU)

(73) Assignee: Robert R. Haski, New South Wales (AU)

( * ) Notice: Subject to any disclaimer, the term of this patent is extended or adjusted under 35 U.S.C. 154(b) by 0 days.

(21) Appl. No.: 10/510,193

(22) PCT Filed: Apr. 2, 2003

(86) PCT No.: PCT/AU03/00399

§ 371 (c)(1),
(2), (4) Date: Sep. 30, 2004

(87) PCT Pub. No.: WO03/087501

PCT Pub. Date: Oct. 23, 2003

(30) Foreign Application Priority Data

Apr. 9, 2002 (AU) .................................... PS 1593

(51) Int. Cl.
*E04H 4/16* (2006.01)
(52) U.S. Cl. .................... 405/60; 4/490; 210/242.1
(58) Field of Classification Search .............. 405/60; 4/490; 210/242.1, 242.3
See application file for complete search history.

(56) References Cited

U.S. PATENT DOCUMENTS

| 3,767,055 | A | * | 10/1973 | Flatland .................... 210/242.1 |
| 4,089,074 | A | * | 5/1978 | Sermons ........................ 4/490 |
| 4,128,068 | A | | 12/1978 | Ogura et al. |
| 4,900,432 | A | * | 2/1990 | Arnold et al. ............ 210/242.1 |
| 5,022,987 | A | * | 6/1991 | Wells ....................... 210/242.3 |
| 5,106,492 | A | * | 4/1992 | Distinti et al. .................. 4/490 |
| 5,128,031 | A | | 7/1992 | Midkiff |
| 5,279,728 | A | * | 1/1994 | Weiss ....................... 210/242.1 |
| 5,788,850 | A | * | 8/1998 | Tuomey ................... 210/242.1 |
| 5,985,156 | A | * | 11/1999 | Henkin et al. ........... 210/242.1 |
| 6,074,553 | A | * | 6/2000 | Haski ....................... 210/242.1 |

FOREIGN PATENT DOCUMENTS

| AU | A-13193/88 | | 9/1988 |
| FR | 2791947 | | 10/2000 |
| JP | 05-208187 | | 8/1993 |
| WO | 94/20690 | * | 9/1994 |

* cited by examiner

*Primary Examiner*—Frederick L. Lagman

(57) ABSTRACT

A water skimmer vessel has two hulls (12, 14) between which a debris collection net or basket-like catcher (22) is arranged. Hinged flaps (68) are provided at each end of the catcher and operate to allow inflow but block outflow of debris from the catcher. Each hull of the vessel is equiped with amoter covered by a guard (28). The vessel may move in either direction and is equipped with sensors (30) on each hulll for effecting the turning and reversing of the vessel upon contact with pool skimmer box inlet (206) and the vessel can be controlled to enter the dock and permit the contents of the catcher to be discharged into the current of pool water flowing into the skimmer box.

21 Claims, 9 Drawing Sheets

DUAL DIRECTION WATER SURFACE SKIMMER AND POOL SIDE DOCKING DEVICE

TECHNICAL FIELD

This invention relates to floating self-propelled devices for skimming oil and other slicks, and/or flotsam and other floating debris, from on or near the surface of water. The skimmers of this invention can be used on confined bodies of water, such as swimming pools, lakes and harbors, as well as on unconfined waters such as the open sea or coastal waters.

In particular, but not essentially, the invention is concerned with water skimmers of the automatic or self-steering type, which are able to traverse an area of water in a random or systematic fashion.

For convenience, the material to be removed by the skimmer will be generically referred to as 'debris', even though it may comprise oil, leaves, insects or the like in addition to litter.

BACKGROUND TO THE INVENTION

In my prior Australian patent 723519 and U.S. Pat. No. 6,074,553, I disclosed a solar-powered water skimmer of catamaran form that dragged a debris collection mesh bag to collect floating debris. A single electric motor turned a propeller to both move the skimmer forwards and assist in driving floating debris into the collection bag. This skimmer was fitted with forwardly facing probes that operated rudders to steer the device around or away from obstacles and/or the edges of the pool or lake. Though of value in swimming pools for leaf and blown-litter collection, this device did not cover the surface of the pool or pond in a very efficient manner, in part because it could not be reversed effectively because of the danger of entangling the propeller and bag.

U.S. Pat. No. 4,900,432 to Arnold et al also disclosed a solar-powered catamaran-style pool skimmer, which collected litter in a central compartment with the aid of a paddle wheel that was also used to propel the vessel forwards. While this skimmer was provided with a separate steering motor to turn the vessel when it contacted an object, it can readily get stuck in a pool corner because the paddle wheel and steering motors only turn in one direction. Indeed, reversal of the paddle wheel to back the vessel off from an object would probably result in the emptying of the litter collection chamber.

U.S. Pat. No. 5,106,492 to Distinti et al also disclosed a solar-powered catamaran-style pool-skimmer powered by a central paddle wheel that was used to move debris into a central collection compartment. This device also suffered from the danger that reversal of the paddle wheel would empty the collection compartment. Also, instead of having active means to steer the vessel after contact with an object, Distinti taught the use of a forwardly extending arm carrying a wheel (mounted for free rotation about a vertical axis) that served to guide or steer the vessel upon contact with a wall. This steering arrangement tends to make the vessel follow the wall until it gets to a corner, where it is likely to remain stuck. Distinti teaches the use of a sensor to detect when the collection compartment is full and to operate an alarm so that the owner can empty the compartment.

OUTLINE OF THE INVENTION

From one aspect, this invention comprises a floating water-skimmer vessel that carries or tows collection means into which floating slicks or debris are guided and collected as the vessel is propelled forward, the skimmer having propulsion means comprising multiple propulsion units mounted in spaced lateral relationship and adapted to drive the skimmer forwards or backwards when operated in unison and to turn the skimmer when operated differentially. Each propulsion unit is preferably of the electrically driven propeller type, the source of electric power preferably being solar cells and/or batteries.

The collection means may comprise a basket, net or the like debris catcher capable of retaining undesirable debris or slicks while allowing water to pass there-through. It is envisaged that entry and exit flaps can be used to permit entry of floating debris into the catcher and inhibit its exit as the vessel bobs on the water. In addition or alternatively, one or more intermediate flaps may be used in the catcher to effect submersion of debris that is floating, in part at least, because it is not well wetted. Retention of oil slicks may be effected by the use of hydrophobic and/or oleophillic material to line or construct the catcher, and/or the associated flap or flaps of the catcher. In this way, the faint slicks produced by suntan oil on the surface of a swimming pool can be collected and retained by the catcher even where the openings in the mesh or catcher are very large relative to oil molecules.

From another aspect, the invention comprises a self-powered floating water-skimming vessel of the multihull-type in which each of at least two hulls houses or carries a propulsion unit (the units being spaced laterally by being mounted in separate but substantially parallel hulls) and in which the catcher comprises a basket-like catcher located between the hulls. The vessel has a first and a second end each capable of serving as the bow or stern and the vessel having port and starboard sides (depending upon which end serves as the bow or stern).

The vessel may have sensor means adapted to sense an obstacle ahead of the vessel's direction of travel and, preferably, the sensor means is adapted to detect objects ahead of the vessel on the port and starboard sides thereof. The sensor means can be connected to the vessel's propulsion system to effect the reversal and/or steering of the vessel to assist it avoid or skirt fixed objects and/or to move it in a substantially random or systematic pattern over the surface of a body of water, such as a pool or lake. In one preferred arrangement where a multihull vessel is employed, the sensor means may include a sensor element located at each corner of the vessel so as to detect contact between the respective corner and a fixed or floating object. Given that some floating objects may be semi-submerged, sensor elements may be located below the waterline instead of or in addition to being located above the waterline.

The vessel may have control means interposed between the sensor means and the propulsion means. In one simple arrangement the control means may be adapted to reverse the direction of propulsion on one side or on both sides of the vessel when an object is sensed by the sensor means, whether on one side or on both sides. The reversal can be implemented for as long as the object is sensed, for a predetermined length of time, for a random length of time in a predetermined time range, or until an object is sensed ahead of the vessel while is it traveling in the new direction.

From another aspect, the invention may comprise a skimmer system or method employing a skimmer vessel of the above-indicated type and docking means into which the vessel may be directed by joint operation of the control means and the sensor means. The docking means may include power supply means for effecting the charging of batteries on the vessel and/or for powering auxiliary functions of the vessel; for example discharge of the collected debris. It is convenient, for example, to locate the docking means in the vicinity of the skimmer box of a swimming pool so that the current of water flowing into the skimmer box effects the emptying debris from the catcher.

For the purpose of docking the vessel in the docking means, the sensing means may be adapted to sense the location of the docking means and the control means may be adapted to control the propulsion means so as to bring the vessel into dock while the docking means is being sensed. For example, the docking means may emit a light beam that is detected by the sensor means, or it may comprise light reflector adapted to reflect light emitted by the vessel. In either case, the detected light may be conveniently referred to as the 'homing light'. It is envisaged that detection of the homing light by the sensor means may be masked or inhibited by high levels of ambient light consistent with daylight, or that the homing light itself may be turned off during daylight hours. This allows the vessel to skim the pool during daylight hours and, when the ambient light falls to a sufficiently low threshold, permits the sensor system to detect the homing light and the control system to dock the vessel.

The control means may include a programmable microprocessor (and associated memory and interfaces) adapted to accept inputs from the sensor elements, the ambient light detector, the homing beam detector and/or the inductive charger and/or docking position (where one or more of these items are used). It may also include inputs from solar cell and battery voltage and current detectors and provide outputs to indicator lights for signaling the normal or abnormal conditions. Given the commercial availability of cheap low-power robotic controllers that can accept such inputs and effect intelligent control over solar cell and battery operation as well as docking and propulsion, a pool skimmer having quite complex and sophisticated functions can be constructed very economically.

If desired, latching or locking means may be employed to hold or retain the vessel in the dock at night and to release it during daylight. The latching or locking means may be operated by the dock or by the control means of the vessel. In the latter case, it preferably involves little or no power drain for the vessel (apart from momentary latching or unlatching, if the function is performed by the vessel). The action of docking, latching or locking may effect raising of one or more of the flaps (where fitted) in the collector means to facilitate transfer of the debris to the skimmer box. The latching of the vessel into the dock also ensures that the inductive power transfer takes place effectively by holding the inductive elements in alignment. It is envisaged that the flow of inductive power into the vessel upon docking could effect operation of a latching mechanism in the vessel and/or dock. Similarly, it is envisaged that, upon detection of full battery charge by the control means while the vessel is docked, the latch can be released and the homing function disabled, even though it is dark.

In one arrangement, operation of the front sensor elements is inhibited or modified when the vessel enters the dock so that it does not back out again before it can be latched. This may be simply achieved by suitably shaping the sides of the dock so that the sensor elements do not contact it, or more preferably, by detecting when the vessel is entering dock. Upon the vessel being fully charged or there being sufficient daylight, the control unit may effect the unlatching of the vessel from the dock and the reversing of the vessel out of the dock. Alternatively, after unlatching the front sensor elements can be allowed to be actuated by the dock and thereby effect the reversal of the vessel.

Given the corrosive character of swimming pool water, a propulsion unit may comprise an electric motor mounted within the hull and a propeller mounted outside the hull, the two being rotationally connected via a magnetic coupling operating through the skin of the hull. Similarly, it is desirable that the sensor elements be isolated as far as possible from the water in which the vessel floats. In one form, for example, it is envisaged that the sensor means comprises multiple sensor elements, each element comprising a magnetic reed switch located within the hull and a deflectable actuator element located outside the hull, the actuator element being such that it is capable of actuating the associated reed switch. Similarly, it is envisaged that the docking means and the hull of the vessel may include embedded inductive coils adapted to be aligned when the vessel is docked so that electric power can be inductively transmitted to a docked vessel to charge its batteries (for example) without the need for any metal to metal contact or any contact of an electrode with pool water.

From another aspect, the invention comprises a water skimmer or vessel that tows a water-permeable collection bag adapted to retain oil or debris and has reversible propeller-type propulsion means mounted in such a manner that contact between the propeller(s) and the trailing bag is prevented, whichever direction the vessel is being driven.

DESCRIPTION OF EXAMPLES

Having portrayed the nature of the present invention, particular examples will now be described with reference to the accompanying drawings. However, those skilled in the art will appreciate that many variations and modifications can be made to the examples without departing from the scope of the invention as outlined above. In the accompanying drawings.

Figure 1:
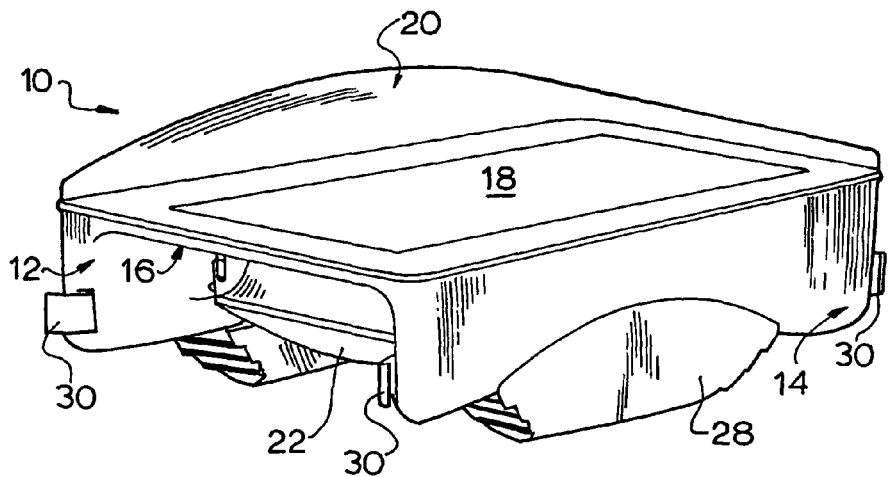
FIG. 1, is a perspective view of a swimming pool skimmer vessel that comprises the first example of an implementation of the invention.
Figure 2:
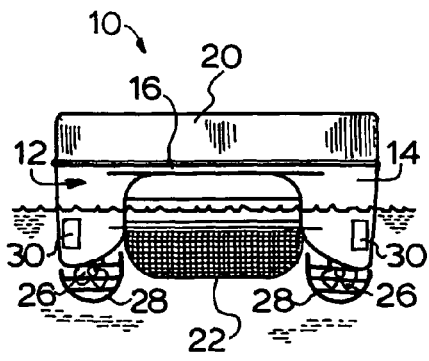
FIG. 2 is an end elevation of the skimmer of FIG. 1.
Figure 3:
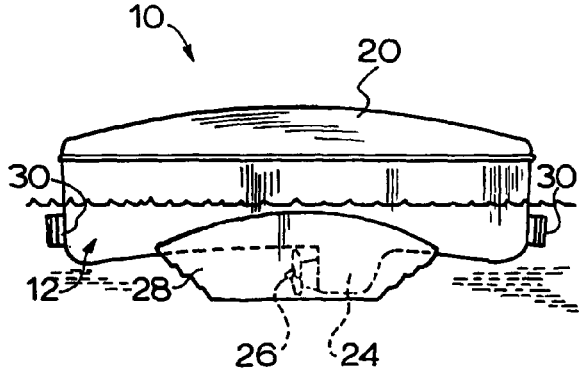
FIG. 3 is a side elevation of the skimmer of FIG. 1.
Figure 6:
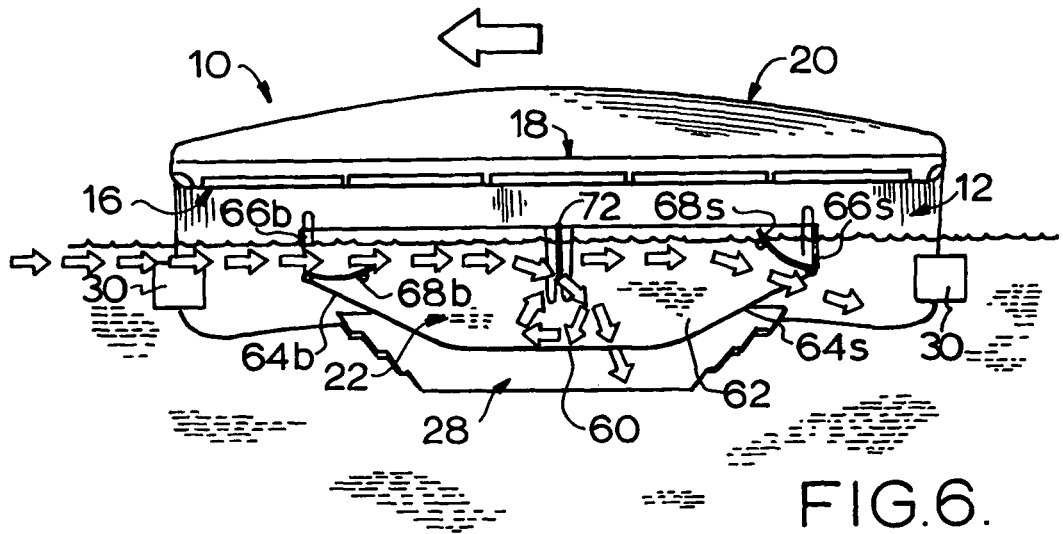

FIG. 6 a side sectional elevation of the skimmer of FIGS. 1–3 with arrows indicating the path taken by water through the skimmer.

Figure 7:
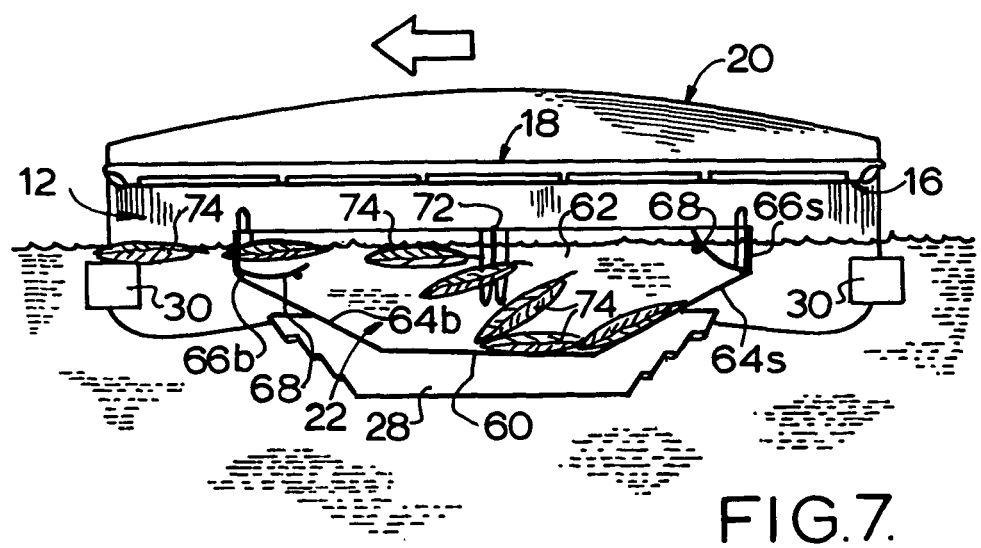

FIG. 7 is a side sectional elevation similar to FIG. 6 indicating the way in which leaves and other floating debris are caught in the skimmer.

Figure 8:
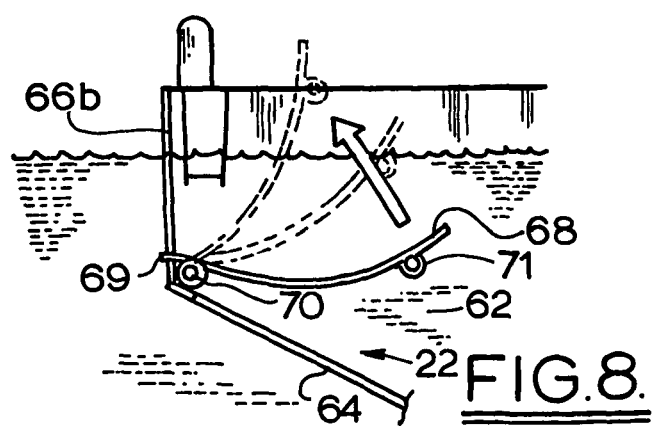

FIG. 8 is an enlarged detail sectional elevation of an end flap of the catcher of the skimmer of FIGS. 1–3 indicating its operation.

Figure 9A:
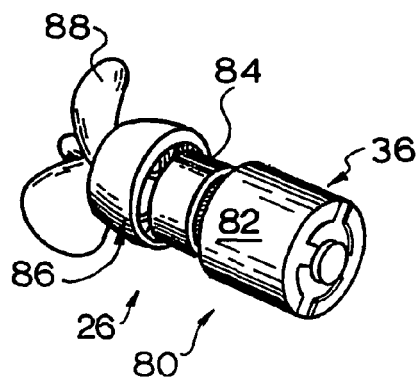
Figure 9B:
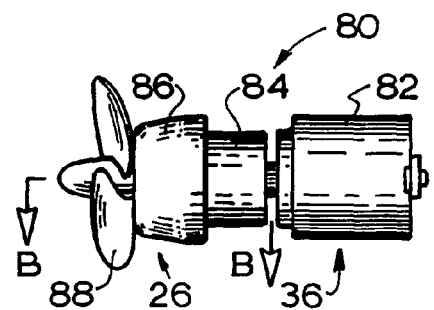
Figure 9C:
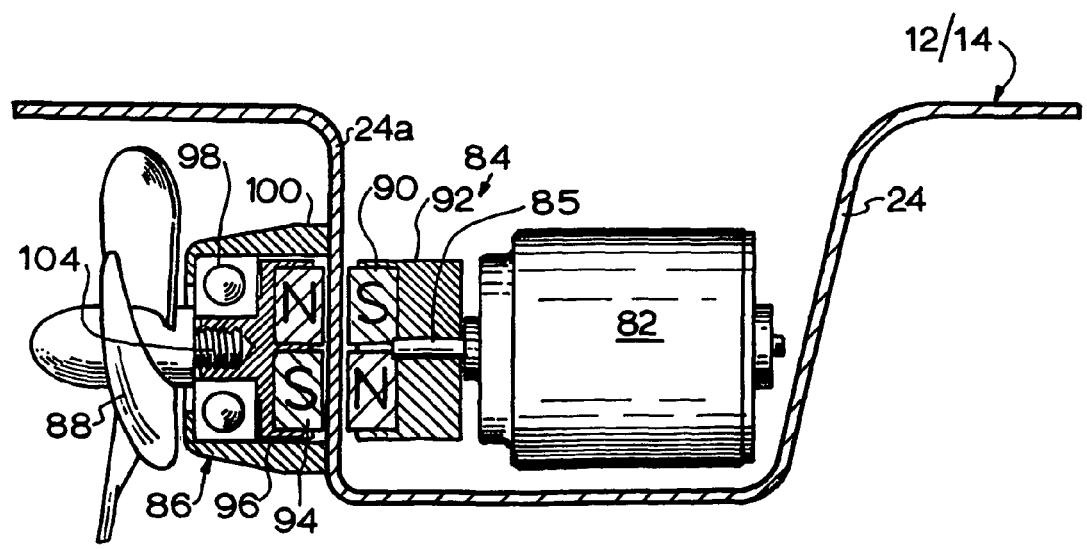

FIGS. 9A–9C are different views of one of the propulsion units of the skimmer of FIGS. 1–3, FIG. 9A being a perspective view without showing the hull of the vessel, FIG. 9B being a side elevation of the unit of FIG. 9A (also without showing the hull) and FIG. 9C being a sectional side elevation of the unit showing the hull in place.

Figure 10:
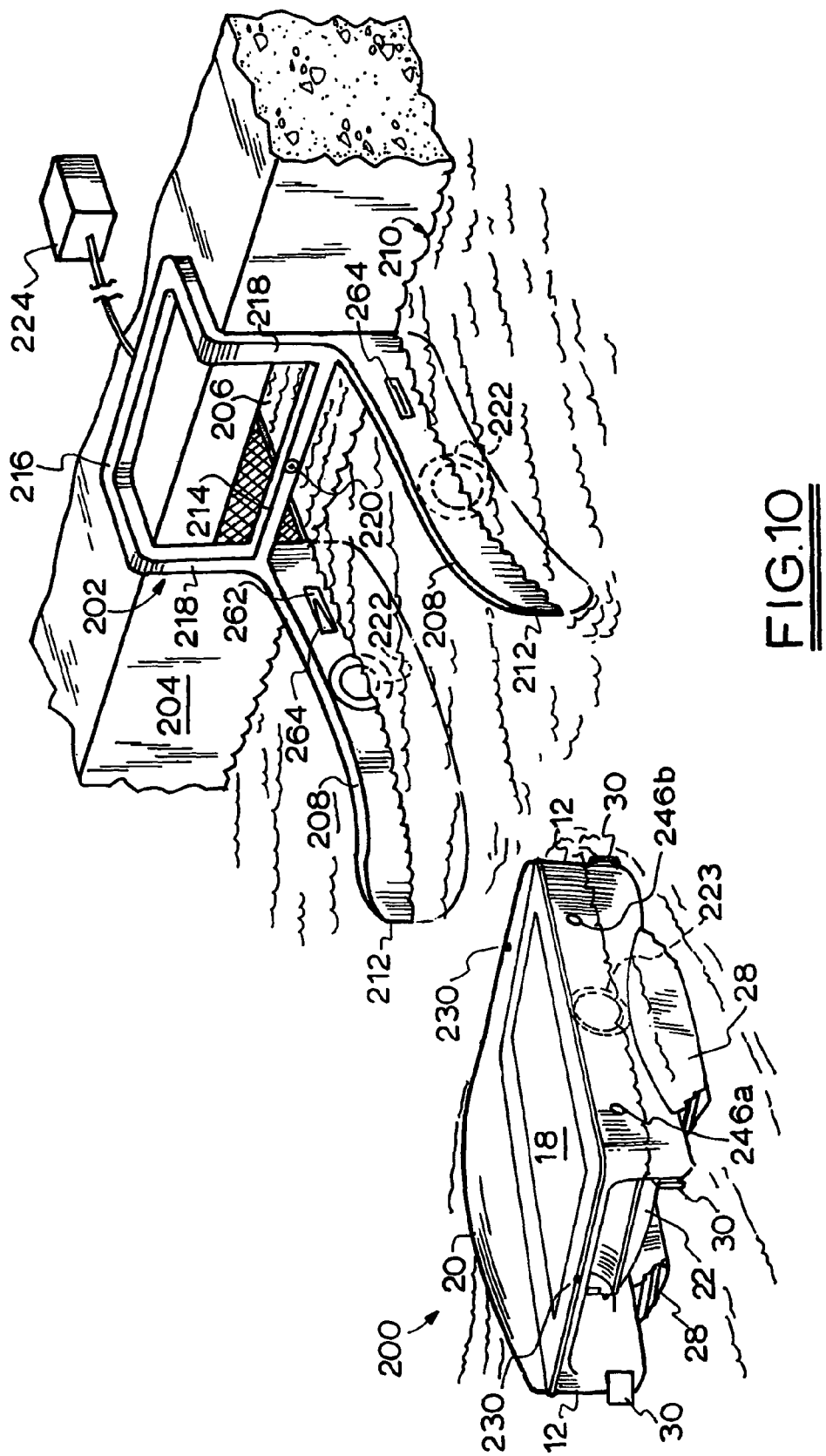

FIG. 10 relates to the second example of the invention and is a perspective view of a dock hung from the edge of a pool in front of the skimmer box and of an approaching a skimmer vessel.

Figure 11A:
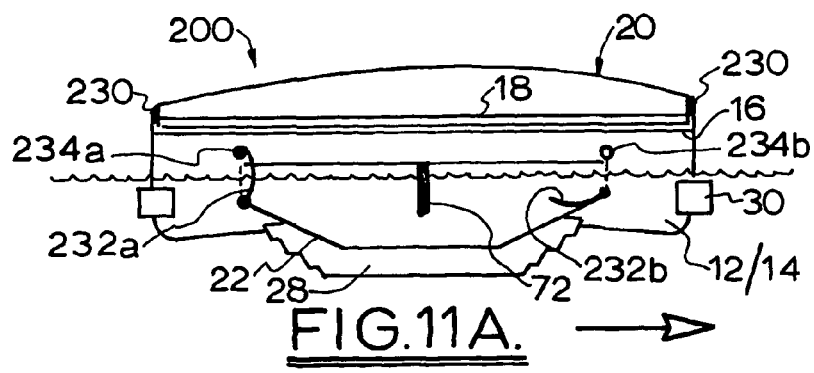
Figure 11B:
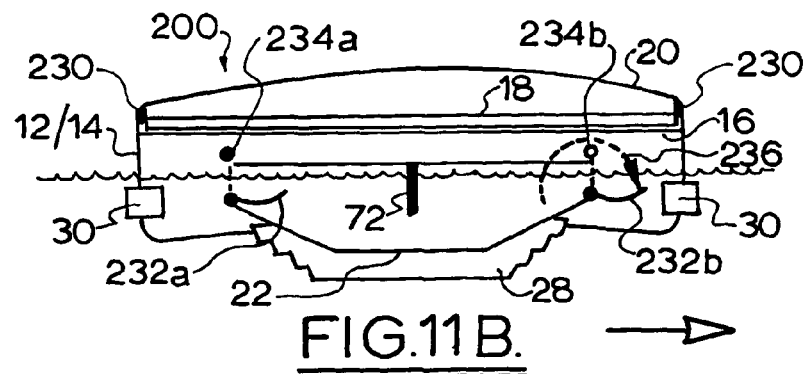
Figure 11C:
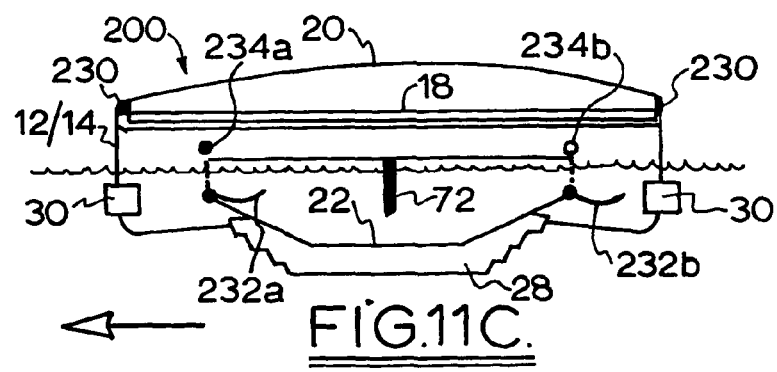
Figure 11D:
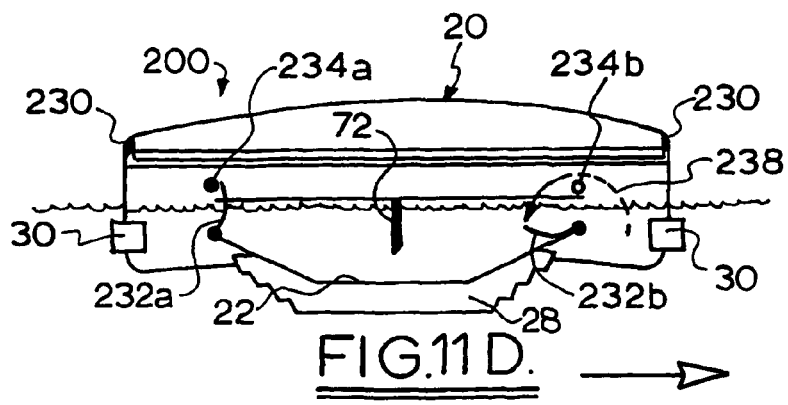

FIGS. 11A–D are diagrammatic longitudinal sectional elevations of the skimmer vessel shown in FIG. 10, FIG. 11A showing the position of the flaps as the vessel approaches the dock, FIG. 11B showing the position of the flaps while the vessel is in the dock, FIG. 11C showing the position of the flaps as the vessel leaves the dock, and FIG. 11D showing the position of the flaps after the transition to normal skimming action.

Figure 12:
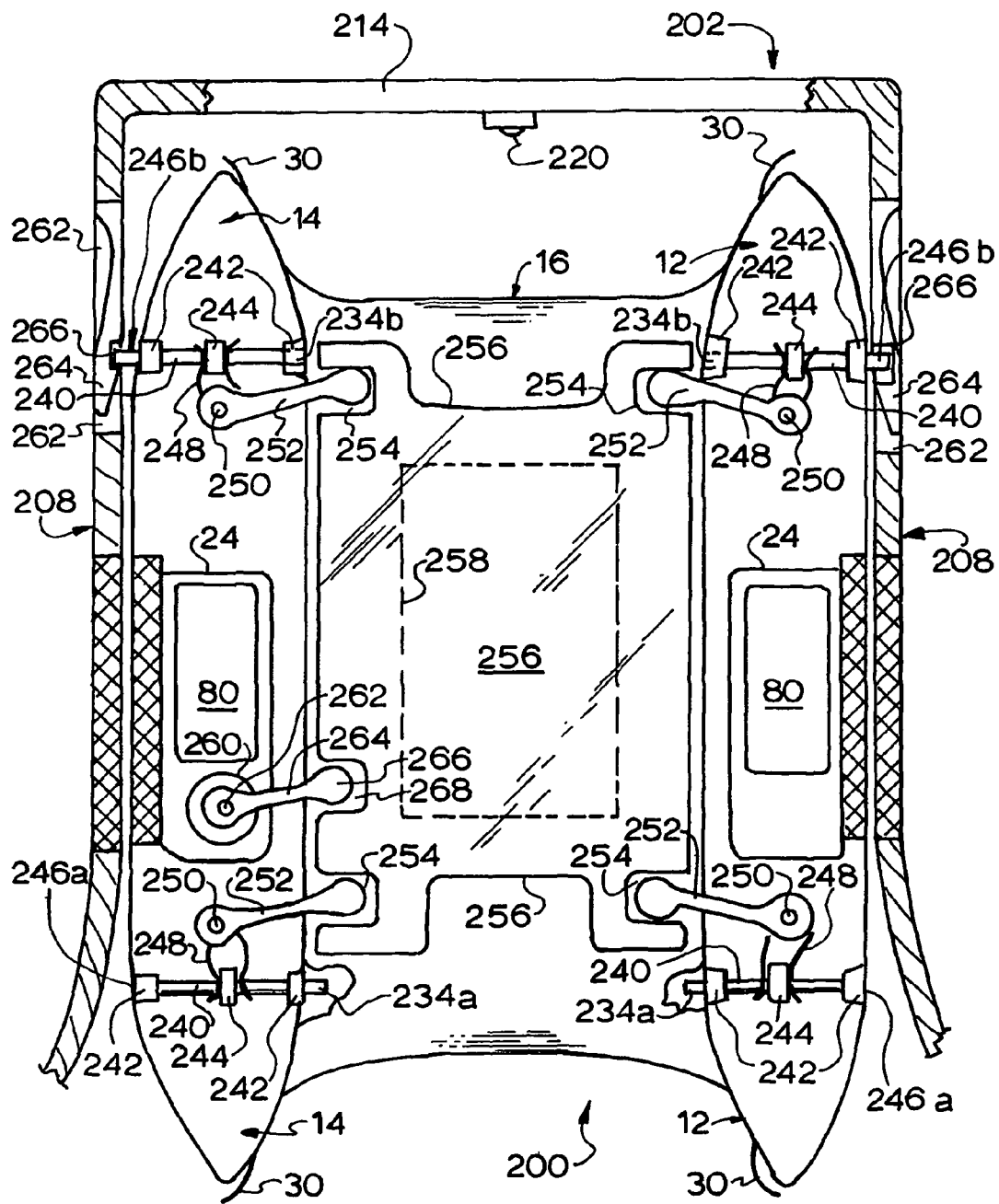

FIG. 12 is a diagrammatic plan view of the vessel of FIGS. 10 and 11 with the cover and solar panel removed to show the mechanism for withdrawing and extending the stops, the vessel being shown in the dock of FIG. 10, which is also shown in section.

Figure 13:
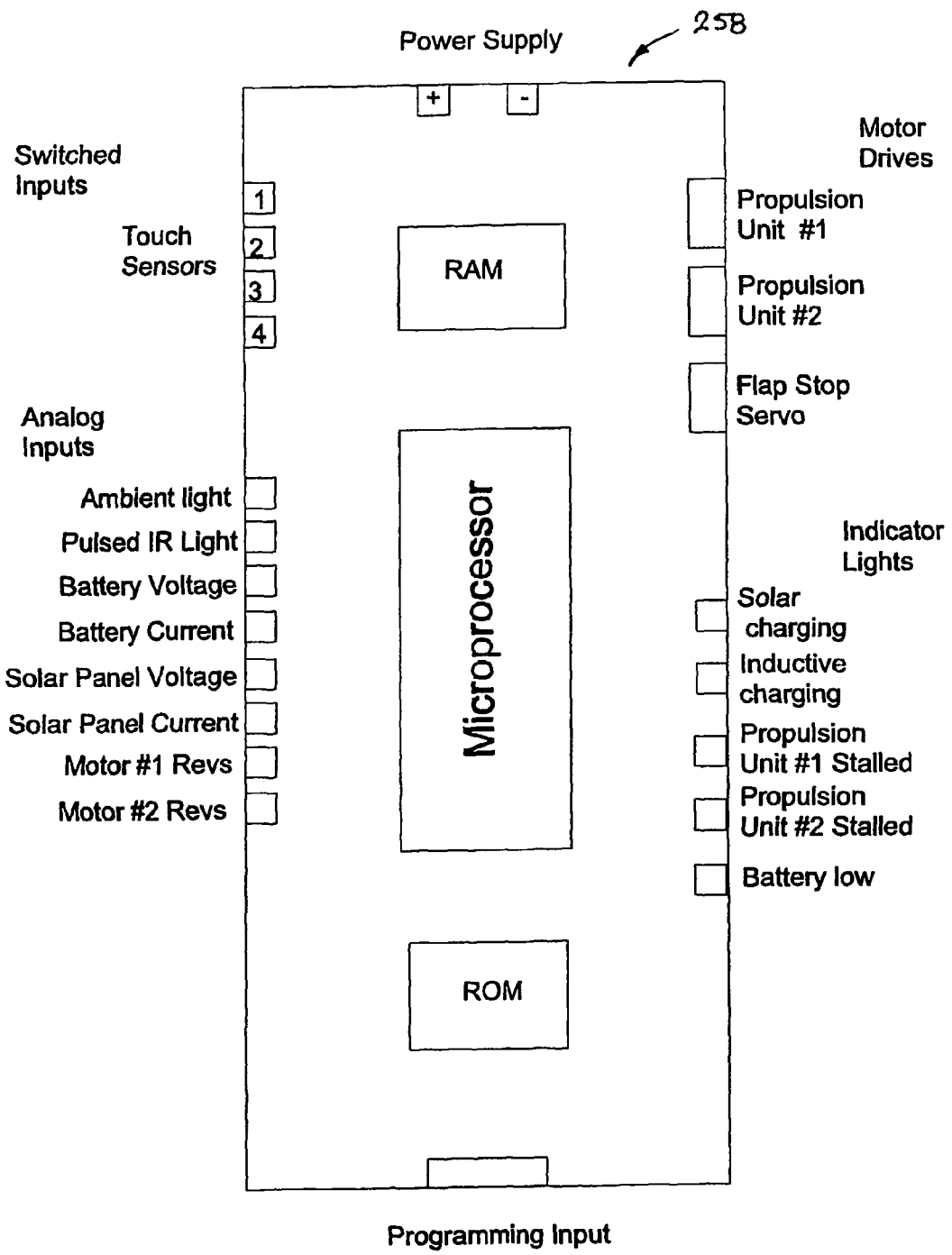

FIG. 13 is a block diagram of a robotic type-control means suitable for use in the skimmer vessel of FIG. 10.

The examples to be described relate to skimmer vessels for use with swimming pools. Referring particularly to FIGS. 1–3, the vessel 10 of the first example comprises a catamaran-type body having hulls 12 and 14 joined together by a horizontal platform 16, which supports a solar panel 18 on its upper face and is covered by a clear plastic cover 20 in a water-tight manner. A mesh basket-like catcher 22 is carried between hulls 12 and 14 for collecting floating debris from the pool surface. A downwardly extending pod 24 is formed on each hull, each pod 24 supporting a propulsion unit comprising an internal motor unit (not shown in FIGS. 1–3) and an external propeller unit 26. Each pod 24 and its propeller 26 unit are covered by a guard 28 to minimize the chance that the propeller will be fouled with floating debris.

A deflectable or bendable flap-like sensor element 30 is attached to the inside surface of each end of each hull 12 and 14 so as to project in front of the respective hull but not outward thereof, each element 30 being mounted a little below the waterline. This arrangement will allow semi-submerged objects ahead of either bow to be detected and it will allow contact with a wall of a pool to be detected, provided the contact is not glancing. The latter feature allows a vessel making glancing contact with the wall of a pool to follow that wall until a corner is reached. Each element 30 incorporates a small magnet (not shown in FIGS. 1–3). Located inside each end of each hull is a magnetically operable reed-switch (not shown in FIGS. 1–3) that closes when the associated sensor element 30 is deflected toward the hull.

Figure 4:
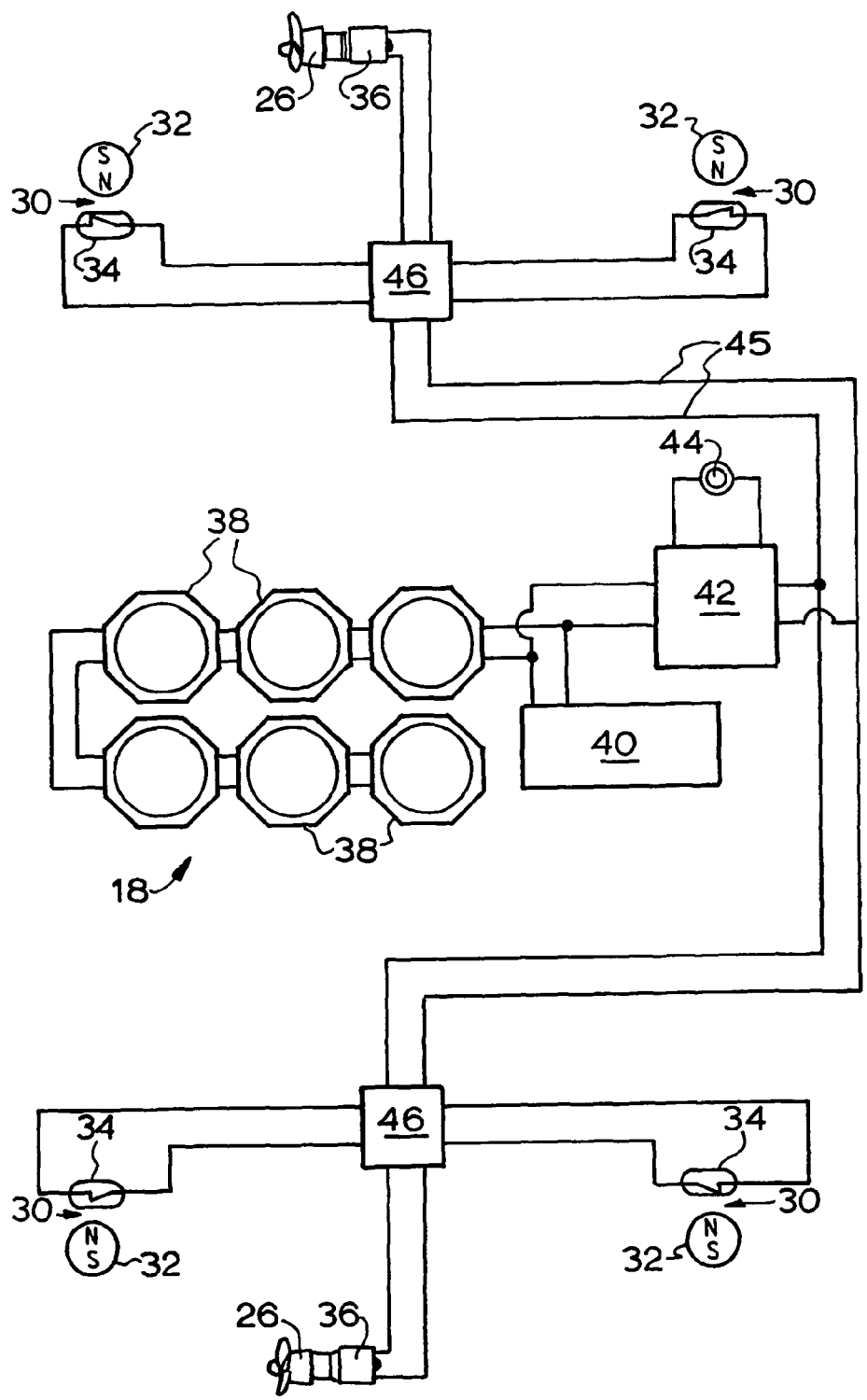
FIG. 4 is a block diagram of a simple control means for use with the skimmer of FIGS. 1–3.

FIG. 4 is a schematic block diagram showing a simple circuit and control system that can be carried by vessel 10. The small magnet incorporated in each sensor element 30 is indicated at 32 and the corresponding reed switch is indicated at 34, while the motor associated with each propeller 26 is shown at 36. The solar cells 38 of panel 18 are connected to a battery 40 and a charging controller 42, which is fitted with an indicator light 44, controller 42 operating to stop discharge of the battery into the solar cells when they are not generating sufficient voltage and operating to prevent overcharging of the battery. The design of charging controller 42 is well known in the art and such devices are available commercially from suppliers of solar cells and panels.

The regulated output of cells 38 and battery 40 is fed via mains 45 to each motor 36 via a respective electrical relay 46 of the latching type that is operable to reverse the polarity of the power supplied to the respective motor 38 (thus reversing the direction of rotation of that motor). Each relay 46 is located in a different hull from the other and is energized by closure of either of the two reed switches 34 on the same hull as the motor 38 connected to that relay. That is, closure of either reed switch on a hull will effect reversal of the motor in that hull until one of those reed switches is again closed, when the motor will again be reversed.

Figure 5:
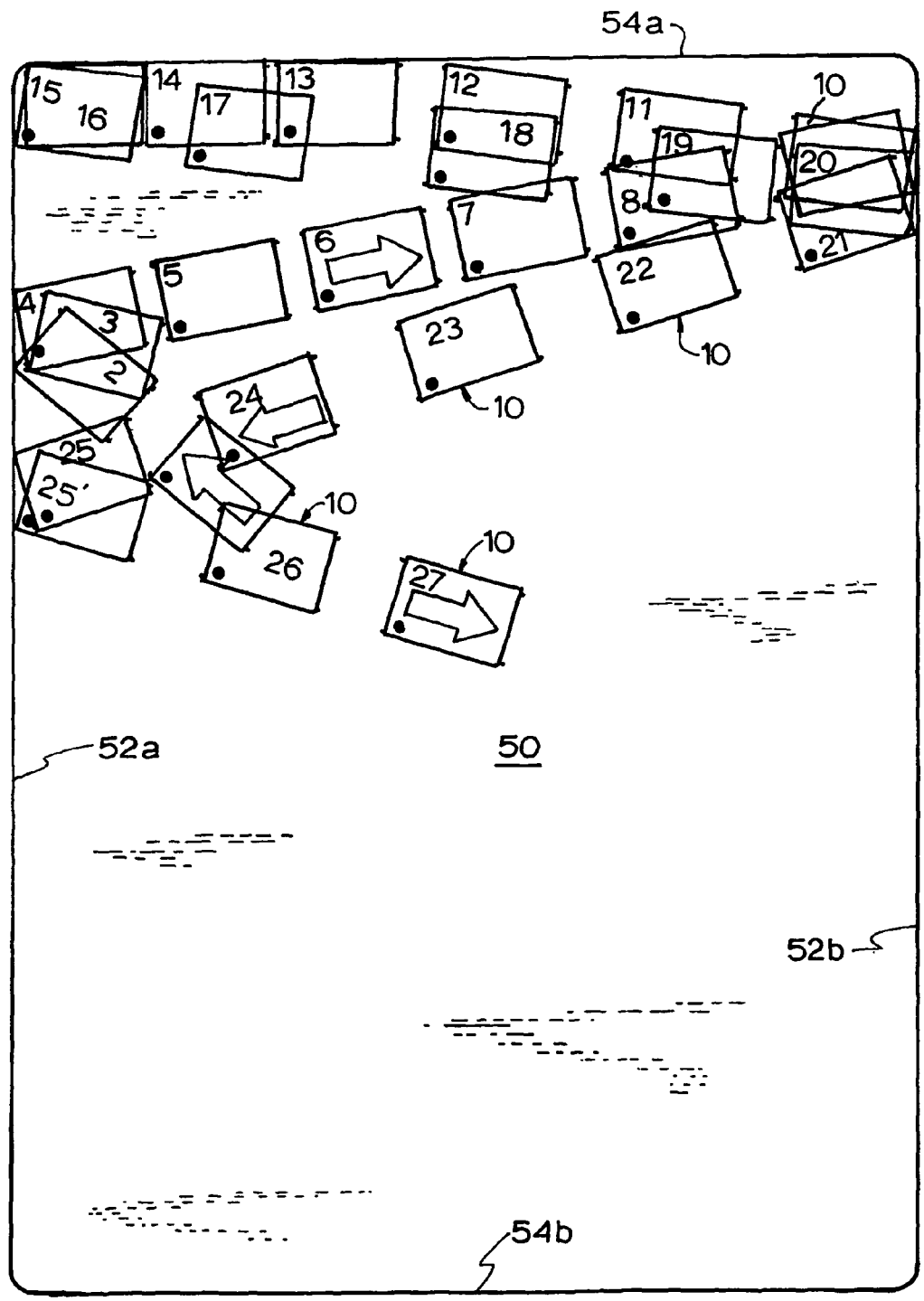
FIG. 5 is a diagrammatic plan view of a pool showing a sequence of positions (from 1 to 27) for the skimmer of FIG. 1 employing the control means of FIG. 4.

FIG. 5 shows the effect of the above described arrangement when vessel 10 is placed in a pool 50 having long walls 52a and 52b and short walls 54a and 54b, a numbered sequence of positions—indicated by # and a numeral— being shown, starting with #1 in which vessel 10 is proceeding in the 10 o'clock direction. [As is conventional, the leading end of the vessel and of each hull 12 and 14 is called the 'bow', the each trailing end is called the 'stern', the right hand side in the direction of travel is called 'starboard' and the left hand side in the direction of travel is called 'port'.] In #2, the sensor element on the port bow contacts long wall 52a and effects the reversal of the portside motor. This swings vessel 10 in an anticlockwise direction (#3) until the starboard sensor element contacts wall 52a, as in #4, and the starboard motor is then also reversed. The vessel then proceeds through positions #5–#9 where, in #9, the starboard sensor contacts long wall 52b at an angle and the starboard motor is reversed. This swings vessel 10 in the clockwise direction until the port sensor contacts wall 52b (#10) and the vessel's direction of travel is again reversed.

After proceeding through positions #11 and #12 the starboard hull of the vessel makes glancing contact with short wall 54a and, since the starboard bow sensor is not actuated, the vessel proceeds along wall 54a (#14) until the starboard sensor is actuated by long wall 52a or the rounded corner between walls 52a and 54a (#15). The starboard motor is then reversed, swinging the vessel clockwise until the port bow sensor contacts wall 52a (#16) and the vessel sets off again in a new direction (#17–#19) until #20 is reached where the port bow sensor hits wall 54b and vessel 10 is turned clockwise to #21 and proceeds in a new direction (#22–#24) until the starboard bow sensor hits wall 54a (#25) causing the vessel to again swing clockwise until port bow sensor contacts wall 54a (#25') and the vessel proceeds in yet another direction, indicated by #26 and #27.

It will be seen from the above sequence that, the vessel 10 of the first example will cover a rectangular swimming pool in a fair systematic manner without the need for intelligent control means.

The manner in which leaves and other debris are collected in removable catcher 22 is illustrated in FIGS. 6–8, catcher 22 being centrally located between the hulls 12 and 14 so that the vessel is balanced. Catcher 22 is preferably open-topped and preferably has a mesh base comprising a low central portion 60, mesh sides 62 and mesh end portions 64 that slope up to end openings 66, which can be closed by semi-buoyant hinged flaps or gates 68 that are pivotally mounted between sides 62 of the catcher by trunnions or a shaft 70 (FIG. 8). As indicated in FIG. 8, each flap 68 is so buoyant that, when it is at the stern of the vessel, it will be swung upwards by the water current past vessel to close stern opening 66s of catcher 22 and, when it is at the bow, it will swing down to uncover the bow opening 66b. [The suffixes 'b' and 's' here and in the following signify 'bow' or 'stern' according to the direction of vessel movement.] Thus, in FIGS. 6 and 7, bow flap 68b is moved down to open the bow end 66b of catcher 22 and stern flap 68s is hinged up to close stern opening 66s. Upward movement of each flap 68 is limited by a stop-strip 69 (FIG. 8). One or more hollow tubes 71 can be incorporated in flaps 68 to add to their buoyancy (and their stiffness), if necessary.

A flap or transverse barrier 72 that is preferably non-pivoting is located in the center of catcher 22 and removably attached sides 62. Barrier flap 72 functions to deflect the water current in catcher 22 downwards as indicated in FIG. 6 to ensure that leaves and other debris 74 (FIG. 7) are also deflected downwards.

This assists in the wetting of the debris and its settling onto the bottom of catcher 22, the carrying of the debris through the catcher being inhibited by the flow of water through the base sloping stern portion 64*s* and by the blockage caused by stern flap 68*s*.

Referring now to FIGS. 9A–9C, the propulsion unit 80 of each hull will now be described. Propulsion unit 80 comprises (i) motor drive unit 36 formed by a low-voltage electric motor 82 and a magnetic coupling part 84 attached to the shaft 85 of motor 82, and (ii) propeller unit 26 formed by a magnetic coupling part 86 attached to propeller 88. Motor unit 36 is located within pod 24 of the hull (12 or 14), while propeller unit 26 is located outside the hull. This arrangement avoids the use of a propeller shaft that passes through the hull and is a source of leaks and corrosion.

With particular reference to FIG. 9C, motor coupling part 84 comprises a magnet 90 molded into the face of a boss 92 mounted on motor shaft 85, and propeller coupling part 86 comprises a magnet 94 molded into a rotor 96 that is mounted in a sealed bearing 98 located in a housing 100 secured to the exterior of pod 24. Propeller 88 has a spigot 104 that is pressed into rotor 96 so that propeller 88 is located and rotated by rotor 96. Coupling parts 84 and 86 need to be coaxially aligned and located as close as possible to the wall 24*a* of pod 24 that separates them so as to minimize the loss of torque due to the gap there between. This can be assisted by locating motor 82 and housing 100 by the use of stops or clips molded onto pod 24, or by assembling the motor unit and the propeller unit using suitable jigs and fixtures.

The second example of the implementation of the present invention will now be described with reference to FIGS. 10, 11 and 12. This example concerns a pool skimming system comprising (i) a skimmer vessel 200 fitted a robotic-type controller (not shown) and (ii) a dock 202 that is rested on the wall 204 of the pool so that it hangs down in front of the skimmer box opening 206. Vessel 200 is similar in many respects to vessel 10 of the first example and the same reference numerals are used to designate the parts that are substantially identical to those of vessel 10.

Dock 202 has a pair of horizontally extending planar and vertically oriented wings 208 that extend below the water level 210 of the pool (ie, below the level of the bottom edge of the skimmer box opening 206) and that diverge outwards toward their outer ends 212 to provide a tapering channel for to guide vessel into position in front of the skimmer box opening. Near the skimmer box, wings 208 are substantially parallel and spaced apart by a little more than the beam of skimmer vessel 200, the spacing of the wings being determined by a crossbar 214 located above skimmer box opening 206 and, optionally, by a second crossbar below the opening (not shown in the drawings). Wings 208 are supported by hanger members 218 joined together by an upper crossbar 216 as well as lower bar 214.

An infrared LED 220 with a pulsing output is located in the center of crossbar 214 to form the homing beacon for vessel 200 and imbedded within each wing 208 is an inductive power transmitter coil 222 for delivering charging power to corresponding receiver coils 223 on vessel 200 when it is docked. Beacon 220 and coils 222 are themselves powered by a low voltage power pack 224, coils 222 being energized at a suitable AC frequency as is known in the art. If desired, power pack 224 may include an ambient light sensor (not shown) that ensures that beacon 220 and coils 222 are only energized at night.

Vessel 200 mainly differs from that of the first example, firstly, in that it has receiver coils 223, it is has an infrared [IR] light sensor 230 at each end (see FIG. 10) and a robotic controller (not shown in FIG. 10) and, secondly, in that the movement of the catcher flaps 232*a* and 232*b* (FIGS. 11A–D) is limited by two pairs of inwardly projecting retractable stops 234*a* and 234*b* (as will be described below with respect to FIGS. 11 and 12). In this example, the catcher 22 is formed as described with respect to the first example and, like that of the first example, can be simply unclipped from the remainder of the vessel for cleaning.

FIGS. 11A–11C illustrate the operation of flaps 232 and stops 234. As before, flaps 232*a* and 232*b* are pivoted from the catcher opening about axes that are transverse to the longitudinal axis of vessel 200, the pivot axes being indicated by solid circles. The stops 234 that are extended so as to limit the movement of the respective flaps 232 are shown in solid black, while those that are withdrawn so as to permit free movement of the respective flaps are shown as open circles.

FIG. 11A shows the positions of flaps 232*a* and 232*b* and of stops 234*a* and 234*b* as the skimmer follows the IR beam towards the dock. It will be seen that the operation of the flaps is essentially the same as that of FIG. 6, but it will be noted that the leading stops 234*b* are withdrawn and the trailing stops 234*a* are extended to limit the rearward movement of flap 232*a*. This arrangement of flaps and stops is the normal arrangement for daytime skimming activity. That is, which ever direction vessel 200 is propelled, (i) the leading flap (232*a* or 232*b*) is deflected into the catcher and the leading stops (234*a* or 234*b*) are withdrawn, and (ii), the trailing flap (232*b* or 232*a*) is always held against full rearward movement under the force of the passing water by the trailing stops (234*b* or 234*a*), which are always extended.

FIG. 11B shows the positions of the flaps and stops after the vessel has entered dock 202. When the vessel is docked, the propulsion units are switched off but the stops remain in their previous positions. The pool water flowing past the vessel to the skimmer box opening 206 has (i) swung trailing flap 232*a* into catcher 22 and (ii) swung leading flap 232*b* forwards and out of catcher 22 through an arc of about 180° (indicated at 236) so as to facilitate the flushing of debris from the catcher into skimmer box opening 206. Leading flap 232*b* is able to swing forwards in this way because leading stops 234*b* remain in their withdrawn position after shutdown of the propulsion units. It is to be noted that, in this context, 'leading', 'trailing' and 'forwards' refer to the motion of the vessel as it entered dock 202.

FIG. 11C shows the positions of the flaps and stops as the vessel leaves the dock, positions that will hold until the vessel again reverses both propulsion units upon its contact with the pool wall or a floating object. It will be seen that, until this occurs, the position of the flaps is unchanged from that of FIG. 11B, but the positions of the stops have changed in that the leading stops (now 234*b*) have been withdrawn and the trailing stops (now 234*a*) have been extended.

As will be seen from FIG. 11D, once both propulsion units have reversed direction (with respect to FIG. 11C), the leading stops are again 234*b* and the trailing stops are again 234*a*, stops 234*b* being again withdrawn and stops 234*a* again being again extended (as in FIG. 11A). Once the vessel is underway in the new direction, leading flap 232*b* is swung rearwards by the water current through about 180° in arc 238 about its pivot axis to adopt the normal skimming position of a leading flap inside the catcher 22 (as in FIG. 11A) and trailing flap 232a is also swung upwards and rearwards until it meets extended trailing stops 234a so as to adopt the normal raised skimming position of a trailing flap. Upon each reversal of direction, the positions of the (new) leading and trailing stops are reversed and the flaps are carried into their (new) normal skimming positions by the passing water.

One way of effecting the desired operation of stops 234 is shown in FIG. 12, which is a plan view vessel 200 with the solar panel and transparent cover removed, side wings 208 of dock 202 being shown in section at the level of the stops 234. In this example, each stop 234 is formed by the inner end of a shuttle bar 240 that is slidably mounted in water-tight inner and outer bearings 242, bar 240 having a central boss 244. The inner ends of bars 240 can extend inwardly through and from the hulls 12 and 14 to form internal stops 234 and their outer ends 246 can extend outwardly through and from the hulls to form external stops (which will also be identified by the numeral 246). It will be seen that, when shuttle bars 240 are moved outwards, inner stops 234 are withdrawn and outer stops 246 are extended, and vice versa. Shuttle bars 240 are arranged horizontally athwart vessel 200 above the waterline but below central portion 16 of the vessel 200.

The movement of each shuttle bar 240 is effected by a fork 248 mounted on a vertical shaft 250 that carries a lever 252 having an inner end which fits into an open slot 254 in an actuator plate 256 that extends over substantially the whole of the central portion 16 of vessel 200. [In fact, plate 256 will have portions removed for various purposes; for example, to save weight, to allow for mounting pillars or screws that fix the solar panel in place and to provide access to the controller unit indicated by a dotted outline 258, which can be located in a depression in central portion 16 of vessel 200 below plate 256.] Plate 256 is supported and guided for limited longitudinal movement with respect to hulls 12 and 14 by suitable means (not shown in FIG. 12). A servo motor 260 is located in the left hand hull 14 of vessel 200 so that its shaft 262 is vertical, shaft 262 carrying an actuator lever 264 having an inner end 266 that fits within a fifth open slot 268 in plate 256. Accordingly, it will be seen that actuation of servo motor 260 to move lever 264 in the clockwise direction will move actuator plate 256 forwards, causing leading inner stops 234b to be withdrawn and inner trailing stops 234a to be extended and, conversely, causing the outer ends 246b of leading bars 240 to be extended and outer ends 246a of trailing bars 240 to be withdrawn.

Servo motor 260 may be of the type employed in model boats and aircraft but, if so, it is preferably of the type that incorporates limit switches rather than a true positional servo that draws current even when its shaft is not moving. Alternatively, servo motor 260 can be a simple geared motor and limit switches (eg, a sealed two-position microswitch or a pair of reed-switches) can be arranged to detect the extreme positions of actuator plate 246. Another option is to avoid the need for limit switches by having controller 258 monitor cut off power to the 'servo' motor current as soon as it detects the rise in current due to the motor stalling at one extreme position of the actuator plate or the other. In any of these ways, power is not required to hold the actuator plate in either of its operating positions.

In FIG. 12, the wings 208 of dock 202 are shown in section at the level of shuttle bars 240. Formed within an opening 262 in each wing is a resilient catch 264 that is deflected when its tapered end is contacted by outer ends 246b of leading bars 240 as vessel 200 nears its 'home' position in dock 202. When the home position is reached, stops 246b enter detents 266 in catches 264 so that vessel 200 is located within the dock in the fore-and-aft direction, even though its propulsion units may still be running. In the home position, as noted above, transmitter coils 222 are aligned with receiver coils 223 and transmission of power from the dock to the vessel commences. Though not shown in FIG. 12, wings 208 of dock 202 are cut away so that the leading contact sensors 30 of vessel 200 cannot make contact therewith.

As soon as the controller unit 258 of the vessel detects transmission of power, it switches off power to the propulsion units, given that controller 258 also detects that the ambient light is dark. The controller's principal function is then to regulate the charging of the batteries (not shown in the drawings). When controller 258 detects ambient daylight and/or a significant voltage from the solar panel, the propulsion units are switched on in the reverse direction (ie, in the direction to take vessel 200 out of dock 202). Accordingly, controller 258 operates servo motor 260 to move actuator plate 256 to its opposition position, withdrawing the former leading outer stops 264b and thereby releasing them from detents 266, permitting vessel 200 to leave dock 202.

As already noted, vessel 200 will proceed to skim the pool surface with its trailing flap open (as in FIG. 11C) until it strikes and object and its direction is reversed. From then on, skimming will be executed in a more efficient manner with the trailing flaps closed, whichever direction the vessel is traveling.

As already indicated, controller 258 can be a commercial robotics-type programmable controller that can be bought from a hobby store. Examples are the Cybug controller sold by Dick Smith Electronics in Australia, the MIT Handyboard sold by The Robotics Store in Hong Kong, and of the RCX controller sold by Lego internationally. Some of these controllers (eg, the RCX) can be programmed to permit a robot to scan for a light source by rotating or oscillating a photodetector, determining the direction of the light source and steering the craft toward or away from it. Without a scanned detector, it is necessary to wait until the vessel of the second example happens to face toward the source before the source can be detected and targeted. By having a detector at both the bow and the stern of the vessel (as indicated in FIG. 10) the use of a scanning detector can be avoided without significant penalty.

FIG. 13 illustrates the general layout of a typical hobby-type, microprocessor-based, robotic programmable-controller (258) with inputs and outputs configured for the vessel (200) of the second example. The programming of such controllers to perform the functions indicated above for vessel 200 can be achieved by the use of programming languages and/or tools provided by the supplier of the boards.

While valuable and useful examples of skimmer vessels formed in accordance with the invention have been provided, it will be appreciated by those skilled in the art that many modifications can be made to the chosen examples, and many other examples can be devised, without departing from the scope of the invention indicated under 'Outline of the Invention' above.

The invention claimed is:

1. A self-powered floating water-skimming vessel for use in collecting debris on or just below the surface of water, the vessel having a waterline and comprising:

two parallel laterally-spaced hulls, propulsion means to drive the vessel in either direction, a debris catcher arranged between the said hulls, at least portion of said catcher being arranged below the waterline, and said catcher having first and second lateral end openings into which debris can enter and exit depending upon whether the respective opening is leading or trailing having reference to movement of the vessel, a first flap hinged to close the first opening of the catcher, when said first opening is the trailing opening so as to block the egress of debris from the catcher, and to open when said first opening is the leading opening to permit ingress of debris into the catcher, a second flap hinged to close the second opening of the catcher, when said second opening is the trailing opening to thereby block the egress of debris from the catcher, and to open when said second opening is the leading opening to thereby permit ingress of debris into the catcher.

2. A vessel according to claim 1 having a third flap hingedly-mounted and laterally-arranged between said first and second flaps, such that floating debris admitted into the catcher tends to be submerged and wetted as it moves toward the trailing opening.

3. A vessel according to claim 2 wherein the propulsion means includes a reversible propulsion unit arranged in each hull so that the vessel can be driven in one direction or the other when said units are operated in together and to turn the vessel when said units are operated differentially.

4. A vessel according to claim 3 wherein:
each propulsion unit is electrically driven,
electric batteries are connected to and capable of driving the propulsion units, and
solar cells are arranged on the vessel and connected to charge the batteries and/or drive the propulsion units.

5. A vessel according to claim 3 wherein:
each propulsion unit comprises an electric motor located within the respective hull,
a propeller mounted outside the respective hull and
magnetic coupling means for transmitting driving torque from the motor to the propeller through the hull.

6. A vessel according to claim 1 wherein;
sensor means is mounted on or in each end of each hull for detecting contact between the respective hull and an obstacle ahead of the vessel's direction of travel,
control means is provided to connect said sensor means to said propulsion means to effect reversal and/or turning of the vessel upon detection of said contact.

7. A vessel according to claim 6 wherein the sensor means comprises:
a moveable magnet arranged on the outside of the hull and adapted to be displaced with respect to the hull upon contact with an object, and
a magnetically operable electrical switch mounted within the hull adjacent said magnet for operation by the movement of the magnet.

8. A vessel according to claim 6 wherein said sensor means is located on or below the waterline on the end of the respective hull.

9. A vessel according to claim 6 wherein said control means causes the vessel to cover substantially the whole surface of a rectangular swimming pool over a period of time.

10. A vessel according to claim 6 wherein said control means effects the reversal of the propulsion unit in one hull for a predetermined time when the sensor means at either end of said hull detects contact with an object.

11. A vessel according to claim 1 wherein at least portion of the catcher or said flaps is formed from or coated with hydrophobic and/or oleophillic material to facilitate the collection of floating oil on the surface of the water within the catcher.

12. A water skimming system for use with a swimming pool having a peripheral wall that extends upwards above the level of pool water including:
a water skimming vessel as claimed in any preceding claim,
docking means provided for mounting on the wall of the swimming pool so as to extend below the level of the pool water, and
homing means in the vessel adapted to direct the vessel into said docking means to effect emptying of the catcher or recharging of batteries in the vessel.

13. A water skimming system according to claim 12 for use with a swimming pool having a water outlet formed in the wall of the pool and wherein said docking means is adapted for mounting in front of the water outlet so that pool water leaving the pool is directed to flow through the docking means, whereby water leaving the pool will flow through the catcher of a vessel located in the docking means to effect the emptying of debris from the catcher into the water outlet.

14. A water skimming system according to claim 13 wherein the vessel or the dock includes flap release means to release the leading flap of the catcher so that it can swing outwardly of the catcher to facilitate flow of debris from the catcher of a docked vessel.

15. A system according to claim 13 wherein the docking means includes:
power supply means for effecting the charging of batteries on a vessel docked therein, and
a homing beacon detectable by the homing means on the vessel, said homing means being connected to the control unit for directing the vessel to the docking means.

16. A system according to claim 15 wherein:
the homing beacon comprises a directional radiation emitter,
the homing means comprises a directional radiation detector adapted to selectively detect the radiation emitted by the emitter, and
the docking means or the homing means includes light sensitive switch means adapted to disable the homing function in ambient sunshine sufficient to charge the batteries of the vessel from the solar power unit.

17. A system according to claim 16 wherein:
the homing means comprises a directional radiation emitter and detector,
the homing beacon comprises a directional radiation reflector, and
the homing means includes light sensitive switch means adapted to disable the homing function in ambient sunshine sufficient to charge the batteries of the vessel from the solar power unit.

18. A water skimming system according to claim 12, wherein:
the docking means includes latching means for holding the vessel in the dock to permit discharge of debris from the catcher or recharging of the batteries in the vessel.

19. A water skimming system according to claim 12 wherein:
the docking means includes a power transmitter connected to the power supply, the vessel includes a power receiver connected to charge the batteries of the vessel, and power transmission is initiated upon latching of the vessel in the dock.

20. A method of removing floating debris from a swimming pool having a peripheral wall containing an outlet opening at the level of water in the pool, the method comprising the steps of:

operating in the pool a self-powered floating skimmer vessel having a catcher for collecting debris, causing the vessel to dock with docking means arranged in front of the outlet opening, and discharging collected debris from the catcher into pool water flowing into the outlet while the vessel is docked.

21. A method according to claim 20 wherein the vessel is powered by solar cells and batteries and the debris catcher has front and rear flaps, the method comprising the steps of:

propelling the vessel over the surface of the pool water with the front flap open to permit debris to enter the catcher, and with the rear flap closed to inhibit debris from leaving the catcher, permitting or causing the front and rear flaps to open when the vessel is docked so that the pool water flowing into the outlet carries debris out of the catcher and into the pool outlet, and charging the batteries in the vessel while it is docked.

\* \* \* \* \*